United States Patent [19]
Felix et al.

[11] Patent Number: 5,946,356
[45] Date of Patent: Aug. 31, 1999

[54] METHOD AND APPARATUS FOR DATA TRANSMISSION WITHIN A BROAD-BAND COMMUNICATIONS SYSTEM

[75] Inventors: Kenneth A. Felix, Crystal Lake; Joseph Rinchiuso, Melrose Park, both of Ill.

[73] Assignee: Motorola, Inc., Schaumburg, Ill.

[21] Appl. No.: 08/895,186

[22] Filed: Jul. 16, 1997

[51] Int. Cl.⁶ .......................... H04L 27/04; H04L 27/12; H04L 27/20; H04B 15/00
[52] U.S. Cl. .......................... 375/295; 375/200; 375/206; 375/260; 455/88; 455/422; 455/574; 370/311; 370/342; 370/441; 370/479
[58] Field of Search .................................. 375/295, 200, 375/201, 202, 203, 206, 260; 455/88, 422, 434, 574; 370/310, 311, 342, 431, 441, 479

[56] References Cited

U.S. PATENT DOCUMENTS

| | | | |
|---|---|---|---|
| 5,430,760 | 7/1995 | Dent | 375/200 |
| 5,574,983 | 11/1996 | Douzono et al. | 455/69 |
| 5,604,730 | 2/1997 | Tiedemann, Jr. | 370/252 |
| 5,621,723 | 4/1997 | Walton, Jr. et al. | 370/18 |
| 5,629,934 | 5/1997 | Ghosh et al. | 370/335 |
| 5,673,259 | 9/1997 | Quick, Jr. | 370/342 |
| 5,751,763 | 5/1998 | Bruckert | 375/200 |

OTHER PUBLICATIONS

US–Japan Third Generation Meeting, Tokyo May 20–21, 1997 "Wideband 95 Direct Spread Forward Link", US Third Generation Air Interface Team.

Lucent Technologies, Motorola, Nortel, Qualcomm, Jun. 23, 1997, Wideband cdmaOne Proposal for Discussions on IMT–2000 in ARIB.

*Primary Examiner*—Stephen Chin
*Assistant Examiner*—Michael W. Maddox
*Attorney, Agent, or Firm*—Kenneth A. Haas

[57] ABSTRACT

Data transmission within a broad-band communication system occurs as follows: During time periods where a remote unit (113) is not actively communicating to a base station (100) utilizing either a fundamental or a supplemental channel, the remote unit (113) is actively or periodically monitoring a forward control channel (IS-95A paging channel) for notification of any pending transmission by the base station (100). The base station (100) determines that a high data rate transmission to the remote unit (113) needs to take place and determines if supplemental channel circuitry (105) is available for utilization. Shortly prior to supplemental channel availability, the base station (100) notifies the remote unit (113) of a pending data transmission and assigns the remote unit (113) a fundamental channel to establish an appropriate transmit power level. Finally, data transmission to the remote unit (113) takes place utilizing the supplemental channel.

16 Claims, 6 Drawing Sheets

METHOD AND APPARATUS FOR DATA TRANSMISSION WITHIN A BROAD-BAND COMMUNICATIONS SYSTEM

FIELD OF THE INVENTION

The present invention relates generally to cellular communication systems and, in particular, to data transmission within a broad-band cellular communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to as Wideband cdmaOne, or Wideband 95. Within such a communication system all remote unit and base station transmissions commonly occur simultaneously within the same frequency band. Therefore, a received signal at a base station or remote unit comprises a multiplicity of frequency and time overlapping coded signals from individual remote units or base stations, respectively. Each of these signals is transmitted simultaneously at the same radio frequency (RF) and is distinguishable only by its specific encoding (channel). In other words, the signal received at a base-station or remote unit receiver is a composite signal of each transmitted signal and an individual signal is distinguishable only after decoding.

Remote unit data transmission within a Wideband 95 communication system takes place by assigning the remote unit a high-speed data channel (referred to as a supplemental channel) and transmitting data as discussed above utilizing the supplemental channel. More specifically, when data transmission is requested, a remote unit is immediately assigned a common traffic channel (fundamental channel), and is power controlled to the correct transmit power until a supplemental channel is available. Once available, data transmission occurs utilizing the supplemental channel. After transmission, the supplemental channel is dropped by the remote unit, and power control continues on the fundamental channel.

Because the number of channels available within a communication system are limited, data transmission within a Wideband 95 communication system decreases system capacity. In particular, the utilization of a fundamental channel for power control for lengthy periods of time needlessly reduces the number of channels available to the system. Therefore, a need exists for a method and apparatus for data transmission within a broad-band communication system.

DETAILED DESCRIPTION OF THE DRAWINGS

Figure 1:
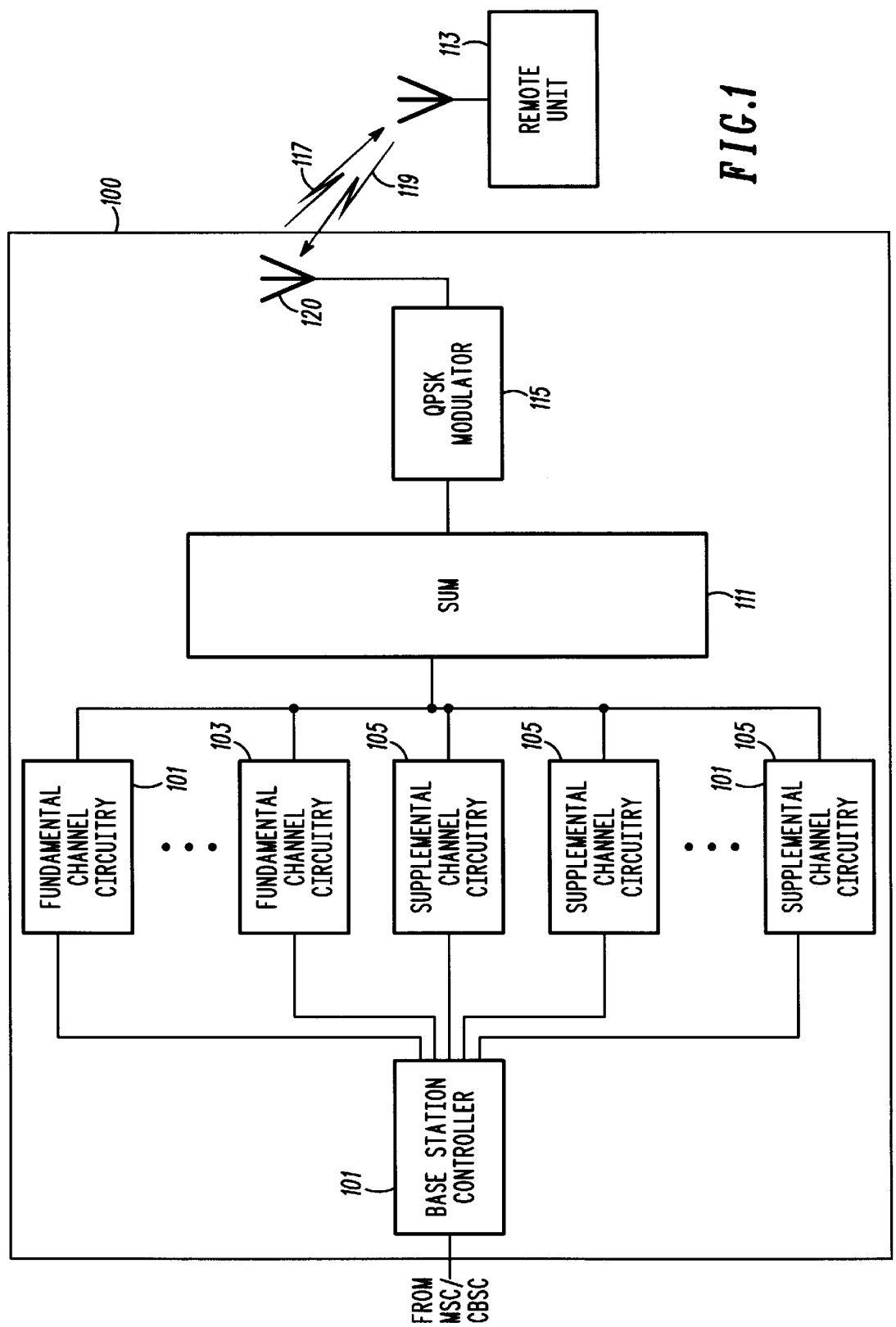
FIG. 1 is a block diagram of a base station for transmitting data in accordance with the preferred embodiment of the present invention.

Stated generally, data transmission within a broad-band communication system occurs as follows: During time periods where a remote unit is not actively communicating to a base station utilizing either a fundamental or a supplemental channel, the remote unit is continuously or periodically monitoring a forward control channel (IS-95A paging channel) for notification of any pending transmission by the base station. The base station determines that a high data rate transmission to the remote unit needs to take place and determines if supplemental channel circuitry is available for utilization. Shortly prior to supplemental channel availability, the base station notifies the remote unit of a pending data transmission and assigns the remote unit a fundamental channel to establish an appropriate transmit power level. Finally, data transmission to the remote unit takes place utilizing the supplemental channel.

The present invention encompasses a method for data transmission within a broad-band communication system. The method comprises the steps of determining that a data transmission needs to take place utilizing a second channel. Next, a time when the second channel will become available is determined and a remote unit is power controlled utilizing a first channel and a first modulation scheme, wherein the step of power controlling is based on the time when the second channel will become available. Finally, data is transmitted on the second channel and a second modulation scheme when the second channel becomes available.

The present invention additionally encompasses a method for data transmission within a broad-band communication system. The method comprises the steps of determining that a data transmission needs to take place utilizing a supplemental channel and determining a time when the supplemental channel will become available. Next, a first modulation scheme is utilized to transmit to the remote unit within a first bandwidth, utilizing a fundamental channel based on the time when the supplemental channel will become available. The remote unit is power controlled based on the transmission and finally data is transmitted to the remote unit within the first bandwidth utilizing the supplemental channel and a second modulation scheme when the supplemental channel becomes available.

The present invention additionally encompasses an apparatus for data transmission within a broad-band communication system comprising a base station controller for determining that a data transmission needs to take place utilizing a first channel and determining a time when the first channel will become available, fundamental channel circuitry for power controlling a remote unit utilizing a second channel and a first modulation scheme, wherein the fundamental channel circuitry power controls the remote unit based on the time when the first channel will become available, and supplemental channel circuitry for transmitting data utilizing the first channel and a second modulation scheme when the first channel becomes available.

FIG. 1 is a block diagram of base station 100 for transmitting data to remote unit 113 in accordance with the preferred embodiment of the present invention. Base station 100 comprises base station controller 101, multiple fundamental channel circuits 103, one or more supplemental channel circuits 105, summer 111, and modulator 115. As shown, base station 100 is communicating to remote unit 113 via downlink communication signal 117, and remote unit 113 is communicating to base station 100 via uplink communication signal 119.

In the preferred embodiment of the present invention, communication to remote unit 113 may take place utilizing the supplemental channel circuitry 105 and/or fundamental channel circuitry 103. In particular, base station 100 utilizes two classes of channels defined for both forward and reverse transmission. In the preferred embodiment, the fundamental channels are similar to existing CDMA traffic channels and are used for voice and signaling, except spread over a wider bandwidth. CDMA traffic channels are described in detail in Mobile Station-Base Station Compatibility Standards for Dual-Mode Wideband Spread Spectrum Cellular Systems, Telecommunications Industry Association Interim Standard 95A, Washington, D.C. July 1993 (IS-95A) which is incorporated by reference herein. As described in IS-95A, the transmission rate of this channel may vary dynamically. Additionally, soft handoff (simultaneous communication utilizing more than one fundamental channel circuit 103) is supported utilizing fundamental channel circuitry 103. The supplemental channels are utilized for communicating high data rate services to remote unit 113. The data rate of the supplemental channels is negotiated prior to transmission. Multiple data sources are time multiplexed on this channel. In addition, the Quality-of-Service (e.g., Frame Error Rate (FER), Bit Error Rate (BER) and/or Transmission Delay) of this channel may be set and operated independently of the fundamental channel.

Data transmission from base station 100 in accordance with the preferred embodiment of the present invention occurs as follows: During time periods where remote unit 113 is not actively communicating to base station 100 utilizing either a fundamental or a supplemental channel, remote unit 113 is actively or periodically monitoring a forward control channel (IS-95A paging channel) for notification of any pending transmission by base station 100. In particular, paging channel circuitry (not shown) is utilized to send messages to remote unit 113 indicating pending downlink transmissions. In the preferred embodiment of the present invention, paging channels circuitry is circuitry such as described in IS-95A Section 7.1.3.4, 7.6.2 and Section 7.7.2. Base station 100 determines that a high data rate transmission to remote unit 113 needs to take place and determines if supplemental channel circuitry 105 is available for utilization. Due to the limited number of supplemental channels available for communication, a supplemental channel may not be available for transmission to remote unit 113. Unlike prior-art methods of data transmission, in the preferred embodiment of the present invention, if the supplemental channel is not immediately available, remote unit 113 is not assigned a fundamental channel until shortly prior to supplemental channel availability. Shortly prior to supplemental channel availability, base station 100 notifies remote unit 113 of a pending data transmission (via a paging channel) and assigns remote unit 113 a fundamental channel to establish an appropriate transmit power level. In particular, base station 100 notifies remote unit 113 of spreading codes (Walsh Codes) utilized by the fundamental and supplemental channels, and an assigned data rate of the supplemental channel.

Continuing, initial power control takes place utilizing the fundamental channel as described in IS-95A sections 6.1.2 and 6.6.3.1.1.1. As described in IS-95A initial forward-link gain must be set high enough to guarantee an acceptable link. Since the channel quality between base station 100 and remote unit 113 is unknown at the time of origination, the call is originated at a minimum forward-link gain and then powered up accordingly. Once at the appropriate power level, communication utilizing the supplemental channel (i.e., data transmission) occurs. In particular, supplemental channel circuitry 105 assigned to remote unit 113 outputs data to be transmitted to summer 111, where it is summed with other channel transmissions. The resulting summed transmissions are then QPSK modulated by modulator 115, and transmitted to remote unit 113 via downlink communication signal 117. At the completion of the transmission the supplemental and fundamental channels are dropped with remote unit 113 again monitoring only the paging channel. Assigning a fundamental channel shortly prior to supplemental channel availability reduces the amount of time a remote unit utilizes a fundamental channel, increasing the number of channels available to the system.

Data transmission from remote unit 113 in accordance with the preferred embodiment of the present invention occurs as follows: During time periods where remote unit 113 is not actively communicating to base station 100 utilizing either a fundamental or a supplemental channel, base station 100 is actively monitoring a reverse control channel, (IS-95A Access channel) for notification of any pending transmission by remote unit 113. Remote unit 113 determines that a high data rate transmission to base station 100 needs to take place and requests a supplemental channel by sending a Packet Service Request to base station 100 utilizing the Access channel. Base station 100 acknowledges the request on the paging channel if supplemental channel capacity is not available. Unlike prior-art methods of data transmission, in the preferred embodiment of the present invention, if the supplemental channel is not immediately available the remote unit 113 is not assigned a fundamental channel until shortly prior to supplemental channel availability. However, if the supplemental channel is available, a fundamental channel is immediately assigned to remote unit 113 to establish the proper transmit power level, and once established, assigned a supplemental channel. Shortly prior to supplemental channel availability, base station 100 notifies remote unit 113 of a pending data transmission (via a paging channel) and assigns remote unit 113 a fundamental channel for establishing a stable power level. In particular, base station 100 notifies remote unit 113 of spreading codes (Walsh Codes) utilized by the fundamental and supplemental channels, and an assigned data rate of the supplemental channel. Once at the appropriate power level, communication utilizing the supplemental channel (i.e., data transmission) occurs. After transmission of data via the supplemental channel, the supplemental and fundamental channels are dropped with remote unit 113 again monitoring only the paging channel. Assigning a fundamental channel shortly prior to supplemental channel availability reduces the amount of time a remote unit utilizes a fundamental channel, increasing the number of channels available to the system.

Figure 2:
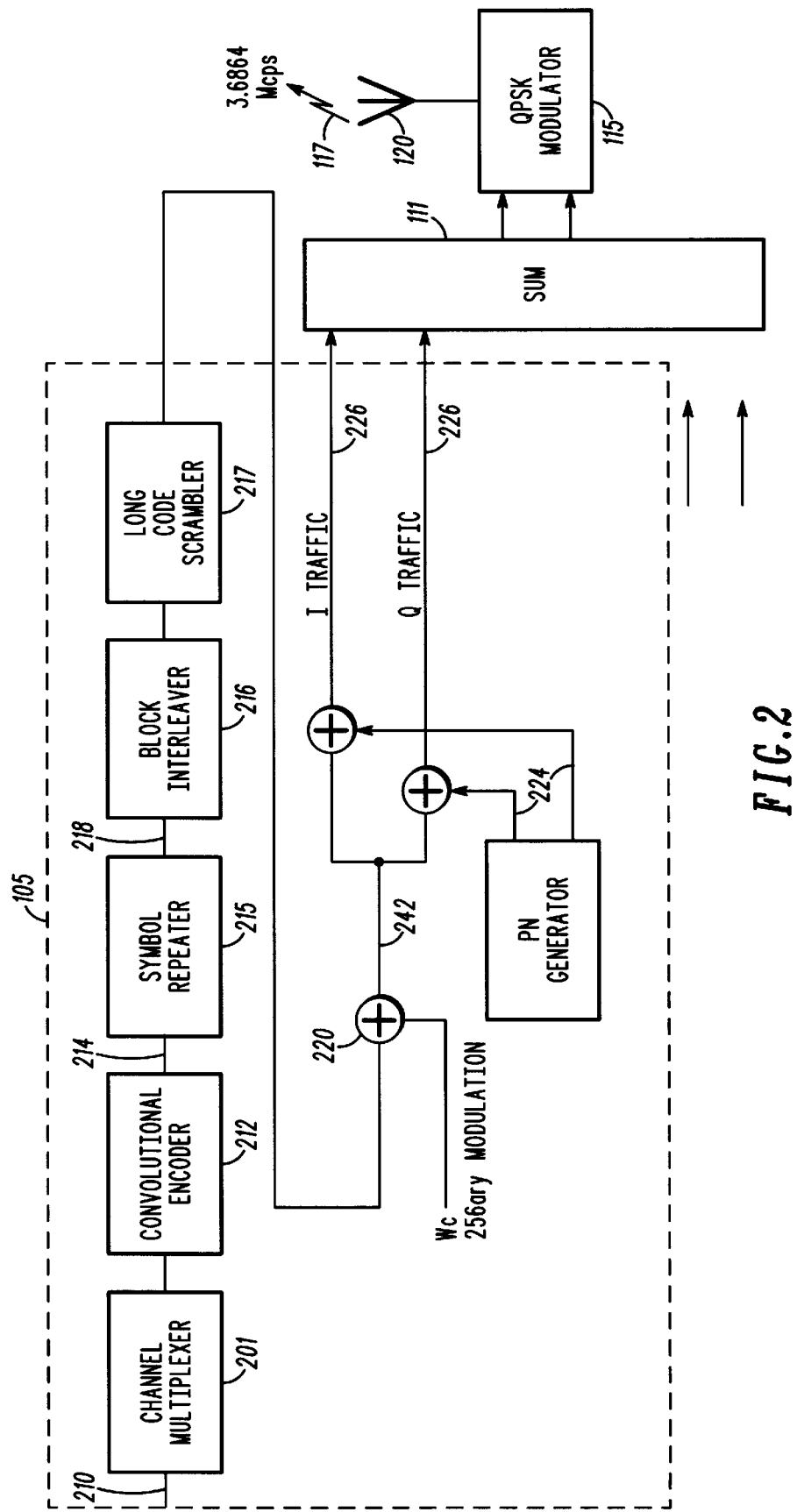
FIG. 2 is a block diagram of fundamental channel circuitry of FIG. 1 for establishing a proper power level of a remote unit in accordance with the preferred embodiment of the present invention.

FIG. 2 is a block diagram of fundamental channel circuitry of FIG. 1 for establishing a proper power level of a remote unit in accordance with the preferred embodiment of the present invention. Fundamental channel circuitry 103 includes channel multiplexer 201, convolutional encoder 212, symbol repeater 215, block interleaver 216, long code scrambler 217, and orthogonal encoder 220. During operation, signal 210 (traffic channel data bits) is received by channel multiplexer 201 at a particular bit rate (e.g., 8.6 kbit/second). Input traffic channel data 210 bits typically include voice converted to data by a vocoder, pure data, or a combination of the two types of data. Channel multiplexer 201 multiplexes secondary traffic (e.g., data), and/or signaling traffic (e.g. control or user messages) onto the traffic channel data 210 and outputs the multiplexed data at 9.6 kbit/sec to convolutional encoder 212. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate ⅓) such that convolutional encoder 212 outputs data symbols 214 at a 28.8 ksymbol/second rate.

Data symbols 214 are then repeated by repeater 215 and input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within a matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 28.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 28.8 ksymbol/second times 20 milliseconds which equals 576 data symbols which defines a 18 by 32 matrix.

Interleaved data symbols 218 are scrambled by scrambler 217 and output to orthogonal encoder 220. Orthogonal encoder 220 modulo 2 adds an orthogonal code (e.g., a 256-ary Walsh code) to each interleaved and scrambled data symbol 218. For example, in 256-ary orthogonal encoding, interleaved and scrambled data symbols 218 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 220 repetitively outputs a Walsh code which corresponds to input data symbol 218 at a fixed symbol rate (e.g., 28.8 ksymbol/second).

Sequence of Walsh codes 242 are further spread by a pair of short pseudorandom codes 224 (i.e. short when compared to the long code) to generate an I-channel and Q-channel code spread sequence 226. The I-channel and Q-channel code spread sequences 226 are used to bi-phase modulate a quadrature pair of sinusoids by driving the power level controls of the pair of sinusoids. The sinusoids output signals are summed, QPSK modulated (by modulator 115) and radiated by antenna 120 to complete transmission of channel data bits 210. In the preferred embodiment of the present invention, spread sequences 226 are output at a rate of 3.6864 Mega Chips per second (Mcps) and radiated within a 5 MHz bandwidth, but in alternate embodiments of the present invention, spread sequences 226 may be output at a different rate and radiated within a different bandwidth. For example, in an alternate embodiment of the present invention an IS-95A transmission scheme may be utilized where spread sequences 226 are output at a rate of 1.2288 Mcps (traffic channel chip rate) within a 1.25 MHz bandwidth.

Figure 3:
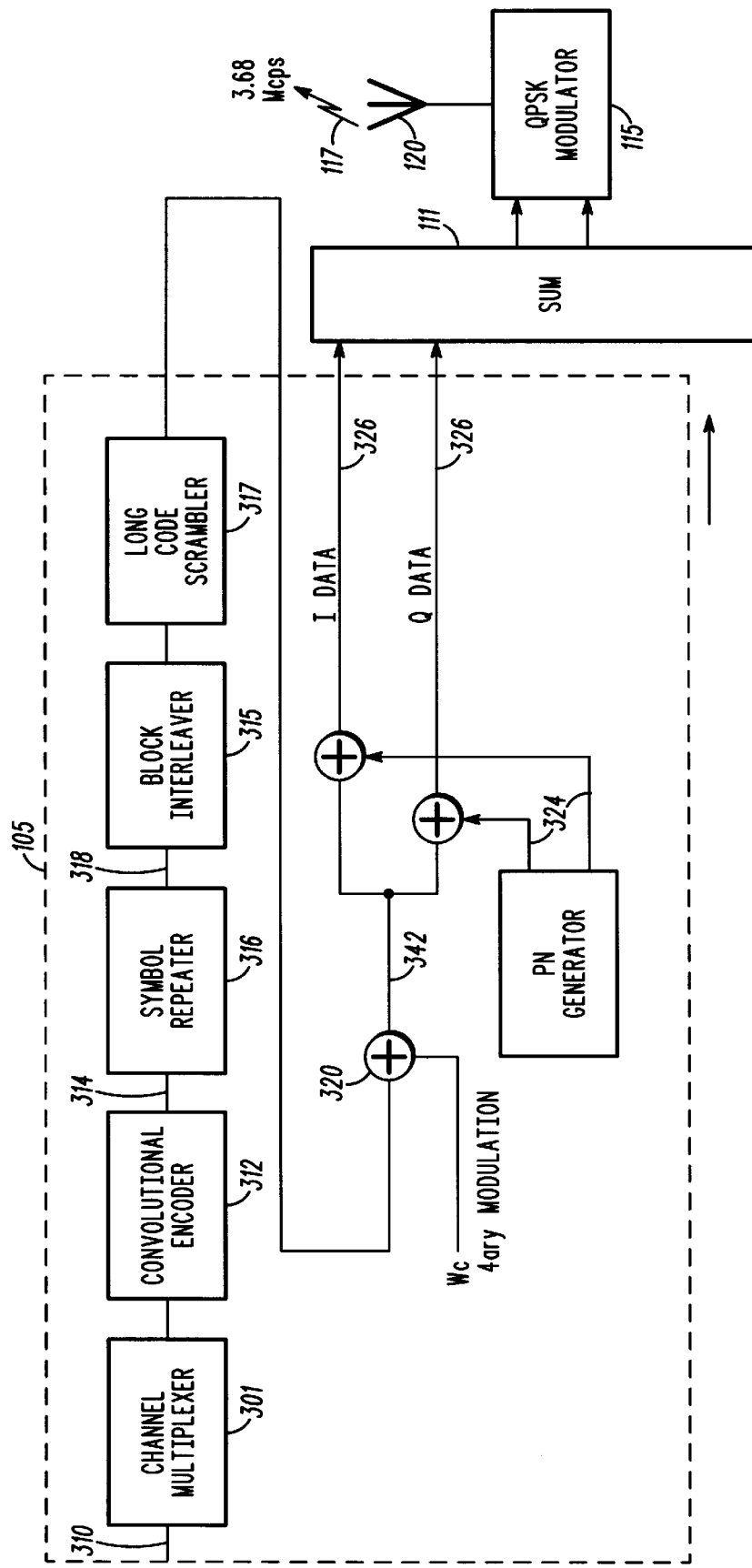
FIG. 3 is a block diagram of supplemental channel circuitry of FIG. 1 for transmitting data in accordance with the preferred embodiment of the present invention.

FIG. 3 is a block diagram of supplemental channel circuitry 105 of FIG. 1 for transmitting data in accordance with the preferred embodiment of the present invention. Supplemental channel circuitry 105 includes channel multiplexer 301, convolutional encoder 312, symbol repeater 315, block interleaver 316, and orthogonal encoder 320. During operation, signal 310 (data) is received by channel multiplexer 301 at a particular bit rate (e.g., 152.4 kbit/second). Channel multiplexer 301 multiplexes secondary traffic (e.g., user data onto the supplemental channel data 310 and outputs the multiplexed data to convolutional encoder 312 at 153.6 kb/s.

Convolutional encoder 312 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 312 encodes input data bits 310 (received at a rate of 153.6 kbit/second) at a fixed encoding rate of one data bit to two data symbols (i.e., rate ⅓) such that convolutional encoder 312 outputs data symbols 314 at a 460.8 kbit/second rate.

Data symbols 314 are then input into interleaver 316. Interleaver 316 interleaves the input data symbols 314 at the symbol level. In interleaver 316, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 316 at the same data symbol rate that they were input (e.g., 460.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 9.216 ksymbols.

Interleaved data symbols 318 are repeated by repeater 315 and output to orthogonal encoder 320. Orthogonal encoder 320 modulo 2 adds an orthogonal code (e.g., a 16-ary Walsh code) to each interleaved and scrambled data symbol 318. For example, in 16-ary orthogonal encoding, interleaved and scrambled data symbols 318 are each exclusive OR'd by a 16 symbol orthogonal code. These 16 orthogonal codes preferably correspond to Walsh codes from a 16 by 16 Hadamard matrix wherein a Walsh code is a single row or column of the matrix. Orthogonal encoder 320 repetitively outputs a Walsh code or its inverse which corresponds to input data symbol 318 at a fixed symbol rate (e.g., 460.8 ksymbol/second).

Sequence of weighted Walsh codes 342 are further spread by a pair of short pseudorandom codes 324 (i.e. short when compared to the long code) to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 115) and radiated by antenna 120 to complete transmission of channel data bits 310. In the preferred embodiment of the present invention, spread sequences 326 are output at 3.6864 Mcps and radiated within a 5 MHz bandwidth.

Figure 4:
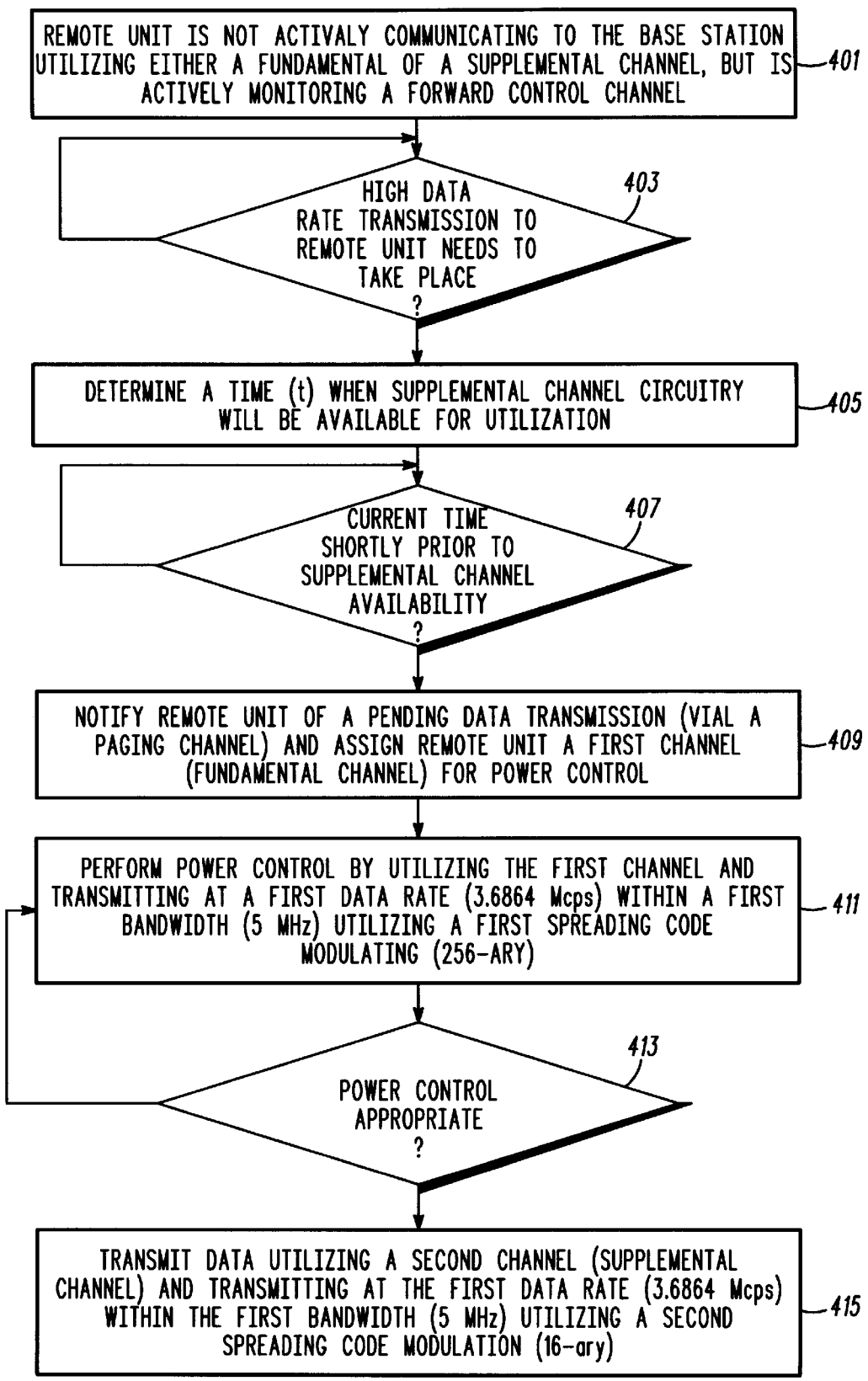
FIG. 4 is a flow chart illustrating transmission of data from the base station of FIG. 1 in accordance with the preferred embodiment of the present invention.

FIG. 4 is a flow chart illustrating transmission of data from base station 100 in accordance with the preferred embodiment or the present invention. The logic flow begins at step 401 where remote unit 113 is not actively communicating to base station 100 utilizing either a fundamental or a supplemental channel, but is actively monitoring a forward control channel, (IS-95A paging channel) for notification of any pending transmission by base station 100. As described above, paging channel circuitry (not shown) is utilized to send messages to remote unit 113 indicating pending downlink transmissions. At step 403 base station controller 101 determines if a high data rate transmission to remote unit 113 needs to take place. If, at step 403 base station controller 101 determines that a high data rate transmission does not need to take place, then the logic flow returns to step 403, otherwise the logic flow continues to step 405. At step 405 controller 101 determines a time (t) when supplemental channel circuitry 105 will be available for utilization and at step 407, controller 101 determines if the current time is shortly prior to supplemental channel availability. In particular controller 101 determines if the current time is t−x, where x is a time period needed for accurate power control of remote unit 113. (In the preferred embodiment of the present invention x is approximately 0.5 seconds). If at step 407 the current time is not less than t−x, then the logic flow returns to step 407, otherwise the logic flow continues to step 409 where base station 100 notifies remote unit 113 of a pending data transmission (via a paging channel) and assigns remote unit 113 a first channel (fundamental channel) for power control purposes. At step 411 power control is performed by transmitting utilizing the first channel. In particular, remote unit 113 is power controlled by transmitting at a first transmission rate (3.6864 Mcps) within a first bandwidth (5 MHz) utilizing a first spreading code modulation scheme (first-ary, or in the preferred embodiment of the present invention, a 256-ary modulation scheme). At step 413 controller 101 determines if appropriate power control has taken place, and if not, the logic flow returns to step 411, otherwise the logic flow continues to step 415 where data transmission utilizing a second channel (supplemental channel) takes place. In particular, data transmission takes place by transmitting at the first transmission rate (3.6864 Mcps) within the first bandwidth (5 MHz) utilizing a second spreading code modulation scheme (second-ary, or in the preferred embodiment of the present invention, a 16-ary modulation scheme). Assigning a fundamental channel shortly prior to supplemental channel availability reduces the amount of time a remote unit utilizes a fundamental channel, increasing the number of channels available to the system. In the preferred embodiment of the present invention, supplemental and fundamental channel transmissions additionally take place simultaneously over the same frequency band, however in alternate embodiments of the present invention, transmissions may take place utilizing different frequency bands for transmission.

Figure 5:
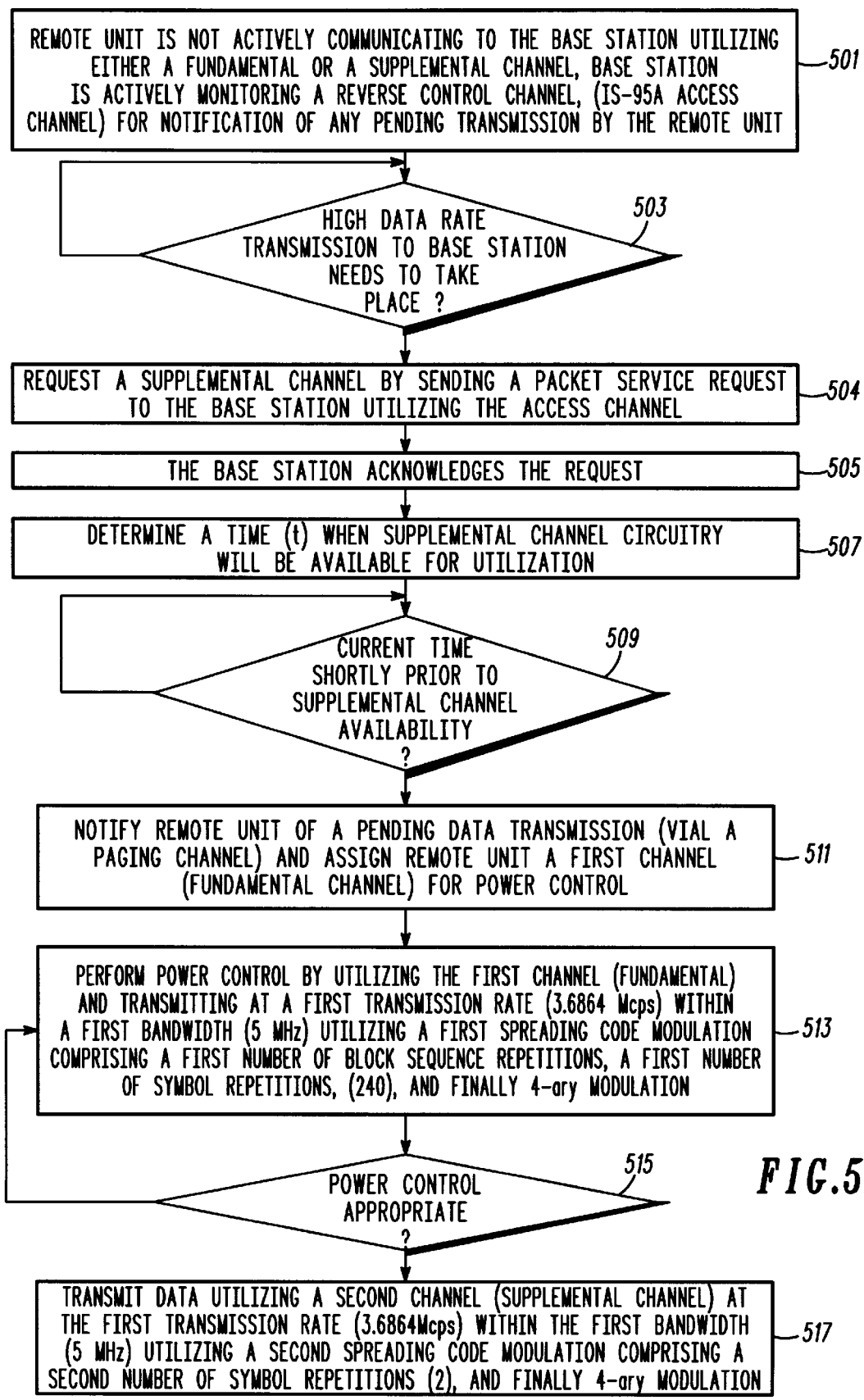
FIG. 5 is a flow chart illustrating transmission of data from the remote unit of FIG. 1 in accordance with the preferred embodiment of the present invention.

FIG. 5 is a flow chart illustrating transmission of data from remote unit 113 in accordance with the preferred embodiment of the present invention. The logic flow begins at step 501 where remote unit 113 is not actively communicating to base station 100 utilizing either a fundamental or a supplemental channel, base station 100 is actively monitoring a reverse control channel, (IS-95A access channel) for notification of any pending transmission by remote unit 113. At step 503 remote unit 113 determines if a high data rate transmission to base station 100 needs to take place and if so, requests a supplemental channel by sending a Packet Service Request to base station 100 utilizing the access channel (step 504), otherwise the logic flow returns to step 503. At step 505 base station 100 acknowledges the request on the paging channel if supplemental channel capacity is not available. Unlike prior-art methods of data transmission, in the preferred embodiment of the present invention, remote unit 113 is not assigned a fundamental channel until shortly prior to supplemental channel availability. In particular, at step 507 controller 101 determines a time (t) when supplemental channel circuitry 105 will be available for utilization and at step 509, controller 101 determines if the current time is shortly prior to supplemental channel availability. In particular controller 101 determines if the current time is t−x, where x is a time period needed for accurate power control of remote unit 113. If at step 509 the current time is not less than t−x, then the logic flow returns to step 509, otherwise the logic flow continues to step 511 where base station 100 notifies remote unit 113 of a pending data transmission (via a paging channel) and assigns remote unit 113 a first channel (fundamental channel) for power control purposes. At step 513 power control is performed utilizing the first channel. In particular, remote unit 113 is power controlled by transmitting at a first transmission rate (3.6864 Mcps) within a first bandwidth (5 MHz) utilizing a first spreading code modulation comprising a first number of block sequence repetitions, a first number of symbol repetitions (24), and finally 4-ary modulation. At step 515 controller 101 determines if appropriate power control has taken place, and if not, the logic flow returns to step 513, otherwise the logic flow continues to step 517 where data transmission utilizing a second channel (supplemental channel) takes place. In particular, data transmission takes place from the remote unit by transmitting at the first transmission rate (3.6864 Mcps) within the first bandwidth (5 MHz) utilizing a second spreading code modulation comprising a second number of symbol repetitions (2), and finally 4-ary modulation. As discussed above, in the preferred embodiment of the present invention, supplemental and fundamental channel transmissions additionally take place simultaneously over the same frequency band.

Figure 6:
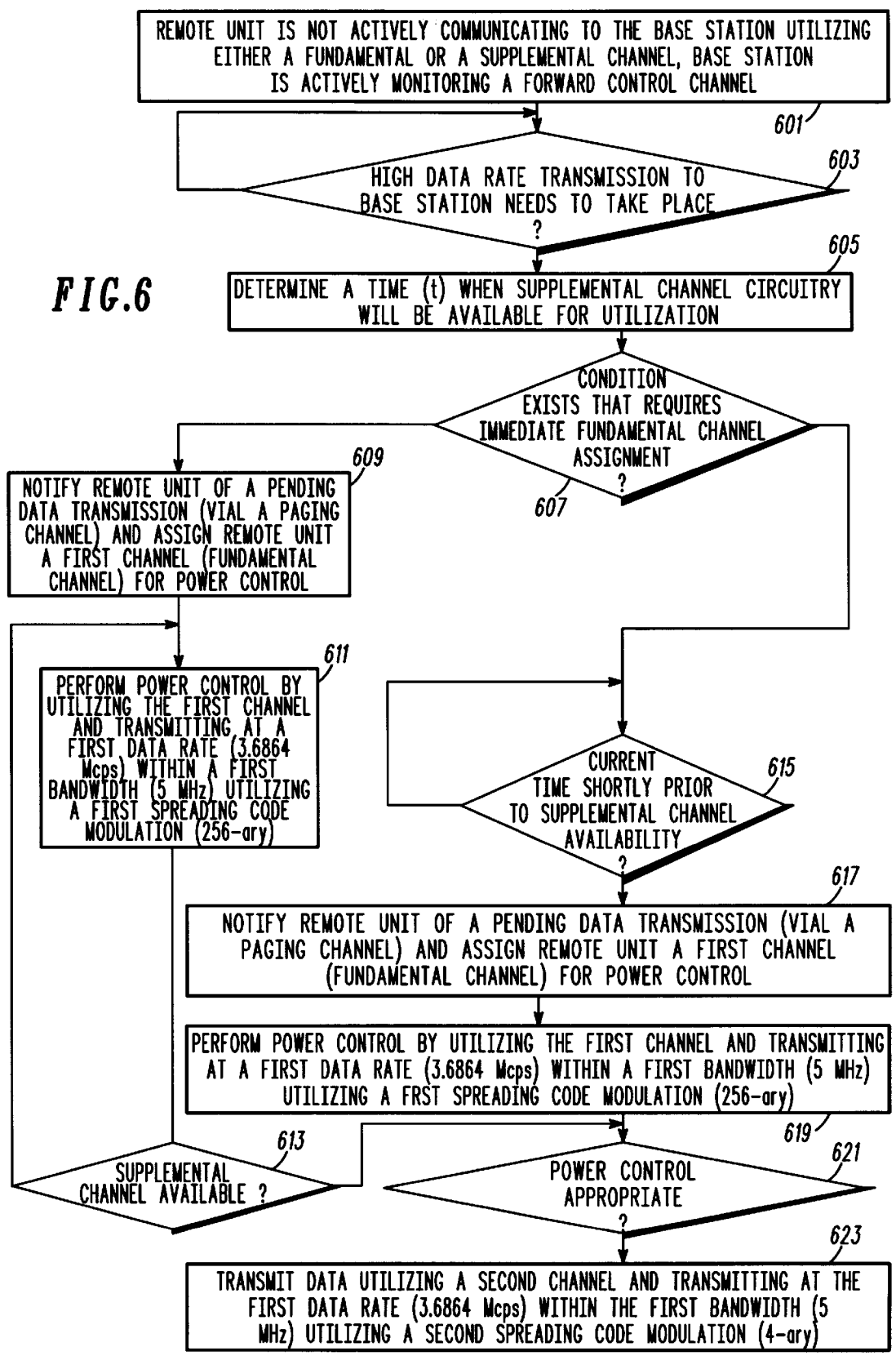
FIG. 6 is a flow chart illustrating transmission of data from the base station of FIG. 1 in accordance with an alternate embodiment of the present invention.

FIG. 6 is a flow chart illustrating transmission of data from the base station of FIG. 1 in accordance with an alternate embodiment of the present invention. In the alternate embodiment of the present invention power control via the prior-art method (i.e., assigning a fundamental channel immediately upon data transmission request) only for certain system conditions and will take place as described in the preferred embodiment of the present invention for all remaining system conditions. The logic flow begins at step 601 where remote unit 113 is not actively communicating to base station 100 utilizing either a fundamental or a supplemental channel, but is actively monitoring a forward control channel, (IS-95A paging channel) for notification of any pending transmission by base station 100. At step 603 base station controller 101 determines that a high data rate transmission to remote unit 113 needs to take place. If, at step 603 base station controller 101 determines that a high data rate transmission does not need to take place, then the logic flow returns to step 603, otherwise the logic flow continues to step 605. At step 605 controller 101 determines a time (t) when supplemental channel circuitry 105 will be available for utilization. At step 607 controller 101 determines if a system condition exists that requires a fundamental channel to be assigned immediately. In the alternate embodiment of the present invention a fundamental channel is assigned immediately if system loading is minimal, otherwise a fundamental channel is assigned as discussed with respect to the preferred embodiment of the present invention. In yet a further alternate embodiment of the present invention a fundamental channel is assigned immediately based on frequency of data transmission. In other words, those remote units that frequently transmit data utilizing supplemental channels are immediately assigned a fundamental channel for control, while those remote units that infrequently transmit data utilizing a supplemental channel are assigned a fundamental channel as described with respect to the preferred embodiment of the present invention.

If at step 607 controller 101 determines that a system condition exists, then the logic flow continues to step 609 where a fundamental channel is immediately assigned to remote unit 113 and remote unit 113 is notified of a pending data transmission. Next, at step 611, remote unit 113 is power controlled by utilizing the first channel and the logic flow continues to step 613. At step 613 controller 101 determines if a supplemental channel is available, and if not, the logic flow returns to step 613, otherwise the logic flow continues to step 621.

Returning to step 607, if controller 101 determines that a system condition does not exist, the logic flow continues to step 615 where controller 101 determines if the current time is shortly prior to supplemental channel availability. In particular controller 101 determines if the current time is t−x, where x is a time period needed for accurate power control of remote unit 113. If at step 615 the current time is not less than t−x, then the logic flow returns to step 615, otherwise the logic flow continues to step 617 where base station 100 notifies remote unit 113 of a pending data transmission via a paging channel) and assigns remote unit 113 a first channel (fundamental channel) for power control purposes. At step 619 remote unit 113 performs power control by transmitting over the first channel. In particular, remote unit 113 is power controlled by transmitting at a first transmission rate (3.6864 Mcps) within a first bandwidth (5 MHz) utilizing a first spreading code modulation (256-ary). At step 621 controller 101 determines if appropriate power control has taken place, and if not, the logic flow returns to step 619, otherwise the logic flow continues to step 623 where data transmission utilizing a second channel (supplemental channel) takes place. In particular, data transmission takes place by transmitting at the first transmission rate (3.6864 Mcps) within the first bandwidth (5 MHz) utilizing a second spreading code modulation (16-ary).

While the invention has been particularly shown and described with reference to a particular embodiment, it will be understood by those skilled in the art that various changes in form and details may be made therein without departing from the spirit and scope of the invention and it is intended that all such changes come within the scope of the following claims:

What is claimed is:

1. A method for data transmission within a broad-band communication system, the method comprising the steps of:
   determining that a data transmission needs to take place utilizing a second channel;
   determining a time when the second channel will become available;
   initiating a first channel utilizing a first modulation scheme, wherein the first channel is utilized for power controlling a remote unit and the first channel is initiated based on the time when the second channel will become available; and
   transmitting data utilizing the second channel and a second modulation scheme when the second channel becomes available.

2. The method of claim 1 wherein the step of power controlling the remote unit further comprises the step of power controlling the remote unit utilizing the first channel, at a first transmission rate, within a first bandwidth, utilizing a first spreading code modulation.

3. The method of claim 2 wherein the step of power controlling the remote unit comprises the step of power controlling the remote unit at a first transmission rate substantially 3.6 Mega chips per second, within substantially a 5 MHz bandwidth, utilizing a 256-ary modulation scheme.

4. The method of claim 2 wherein the step of power controlling comprises the step of power controlling the remote unit at a first transmission rate within a first bandwidth utilizing a first spreading code modulation comprising a first number of block sequence repetitions, a first number of symbol repetitions and a first-ary modulation.

5. The method of claim 2 wherein the step of transmitting the data further comprises the step of transmitting the data utilizing the second channel, at the first transmission rate, within the first bandwidth, utilizing a second spreading code modulation.

6. The method of claim 5 wherein the step of transmitting the data comprises the step of transmitting the data at a first transmission rate substantially 3.6 Mega chips per second, within substantially a 5 MHz bandwidth, utilizing a 16-ary modulation scheme.

7. The method of claim 5 wherein the step of transmitting the data comprises the step of transmitting the data at the first transmission rate within the first bandwidth utilizing a second spreading code modulation comprising a second number of symbol repetitions and the first spreading code modulation.

8. A method for data transmission within a broad-band communication system, the method comprising the steps of:
   determining that a data transmission needs to take place utilizing a supplemental channel;
   determining a time when the supplemental channel will become available;
   transmitting to a remote unit utilizing a first modulation scheme, within a first bandwidth, utilizing a fundamental channel, wherein the step of transmitting is initiated based on the time when the supplemental channel will become available;
   power controlling the remote unit based on the transmission; and
   transmitting data within the first bandwidth utilizing the supplemental channel and a second modulation scheme when the supplemental channel becomes available.

9. The method of claim 8 wherein the step of transmitting to the remote unit comprises the step of transmitting to the remote unit utilizing a 256-ary modulation scheme within a 5 MHz bandwidth.

10. The method of claim 9 wherein the step of transmitting data within the first bandwidth comprises the step of transmitting utilizing a 16-ary modulation scheme within the 5 MHz bandwidth.

11. The method of claim 8 further comprising the step of determining if a condition exists that requires immediate fundamental channel assignment and the step of transmitting to the remote unit comprises the step of transmitting based on the condition.

12. An apparatus for data transmission within a broadband communication system, the apparatus comprising:
   a base station controller for determining that a data transmission needs to take place utilizing a first channel and determining a time when the first channel will become available;
   fundamental channel circuitry for power controlling a remote unit utilizing a second channel and a first modulation scheme, wherein the fundamental channel circuitry transmits based on the time when the first channel will become available; and
   supplemental channel circuitry for transmitting data utilizing the first channel and a second modulation scheme when the first channel becomes available.

13. The apparatus of claim 12 wherein the fundamental channel circuitry transmits at a first transmission rate, within a first bandwidth, utilizing a first spreading code modulation.

14. The apparatus of claim 13 wherein the first transmission rate is substantially 3.6 Mega chips per second, the first bandwidth is substantially 5 MHz, and the first spreading code modulation is a 256-ary modulation scheme.

15. The apparatus of claim 12 wherein the supplemental channel circuitry transmits at a first transmission rate, within a first bandwidth, utilizing a second spreading code modulation.

16. The apparatus of claim 15 wherein the first transmission rate is substantially 3.6 Mega chips per second, the first bandwidth is 5 MHz, and the second spreading code modulation is a 16-ary modulation scheme.

* * * * *